(12) United States Patent
Kimotsuki (10) Patent No.: US 7,877,001 B2
(45) Date of Patent: Jan. 25, 2011

(54) RECORDING AND REPRODUCING APPARATUS AND VIDEO AND AUDIO SIGNAL EDITING METHOD THEREFOR

(75) Inventor: Kenji Kimotsuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1260 days.

(21) Appl. No.: 11/452,437

(22) Filed: Jun. 14, 2006

(65) Prior Publication Data

US 2006/0285826 A1  Dec. 21, 2006

(30) Foreign Application Priority Data

Jun. 14, 2005  (JP) .......................... P2005-173928

(51) Int. Cl.
*H04N 5/80* (2006.01)
(52) U.S. Cl. .................... 386/249; 386/326; 386/278
(58) Field of Classification Search .................. 386/46, 386/95
See application file for complete search history.

(56) References Cited

U.S. PATENT DOCUMENTS 5,668,917 A * 9/1997 Lewine ........................ 386/52

FOREIGN PATENT DOCUMENTS

| JP | 10-112090 | 4/1998 |
| JP | 2001-266548 A | 9/2001 |
| JP | 2002-354406 A | 12/2002 |
| JP | 2003-32598 | 1/2003 |
| JP | 2004-7155 | 1/2004 |
| JP | 2005-102058 A | 4/2005 |

* cited by examiner

*Primary Examiner*—Thai Tran
*Assistant Examiner*—Girumsew Wendmagegn
(74) *Attorney, Agent, or Firm*—Morgan, Lewis & Bockius LLP (57) ABSTRACT

A plurality of standard television broadcast programs recorded on a recording medium are selected. Video and audio signals of one of the selected plurality of standard television broadcast programs are reproduced. Markers are attached to a standard video-and-audio part of the reproduced video and audio signals of the one of the selected plurality of standard television broadcast programs. The standard video-and-audio part is registered. Video and audio signals of another one of the selected plurality of standard television broadcast programs are serially reproduced. The reproduced video and audio signals are compared with the standard video and audio signals of the registered standard video-and-audio part to thereby determine a video-and-audio part of the reproduced video and audio signals, which is substantially matched with the registered standard video-and-audio part.

4 Claims, 6 Drawing Sheets

RECORDING AND REPRODUCING APPARATUS AND VIDEO AND AUDIO SIGNAL EDITING METHOD THEREFOR

BACKGROUND

1. Technical Field

The present invention relates to a recoding and reproducing apparatus configured to record and reproduce video and audio signals of a television broadcast program on and from a recording medium and to a method adapted to edit the video and audio signals and, more particularly, to a recoding and reproducing apparatus enabled to easily skip playback of or cut an unnecessary part, such as a CM (Commercial Message), of a standard television broadcast program recorded on a recording medium and also to a method adapted to edit video and audio signals of the television broadcast program.

2. Description of Related Art

Generally, when video and audio signals of a television broadcast program are recorded on a recording medium and when the video and audio signals of the television broadcast program recorded on the recording medium are reproduced, it is usually performed to reproduce and view only a main part of the television broadcast program by skipping playback of unnecessary parts, such as a CM, an opening part, an ending part, and a preview. Also, when the dubbing of the video and audio signals of a television broadcast program recorded on a recording medium is performed, a user should operate the operation keys of a remote control device to thereby cut unnecessary parts, such as a CM, so as not to dub the unnecessary parts. Especially, when the playback or the dubbing of a plurality of standard television broadcast programs, such as serial television broadcast programs to be broadcasted in parts, is performed, there is a problem that a user should operate operation keys of a remote control device to thereby skip or cut unnecessary parts of each of the plurality of standard television broadcast programs recorded on a recording medium.

When the signals of a program are recorded or reproduced, a first signal is recorded at a position, at which playback or cutting is started. A second signal is recorded at a position, at which the playback or the cutting is stopped. After the first signal and the second signal are recorded, at playback of the signals of the program, fast-forwarding is performed when the first signal is detected. The fast-forwarding is stopped when the second signal is detected (see, for example, JP-A-10-112090).

Channel information of a recorded broadcast program is extracted. It is then detected whether a change occurs in the channel information. When an occurrence of a change in the channel information is detected, the recorded program is indexed with an index indicating the occurrence of the change in the channel information. At playback of the program, some recorded data is skipped according to the index (see, for instance, JP-A-2003-32598).

User operation history information representing a history of performing user operations of recording and reproducing of a program according to a user's instruction is stored, that an erasure region of the recorded program is determined according to the user operation history information, and that partial erasure or no-erasure is performed on the program, which is recorded according to the user operation history information, to thereby ensure a free space of a recording medium (see, for example, JP-A-2004-7155).

SUMMARY

According to the above-related art, when the signals of a program are recorded or reproduced, a first signal at a position, at which playback or cutting is started, and also a second signal at a position, at which the playback or the cutting is stopped. Thus, this apparatus is enabled so that after the first signal and the second signal are recorded, at playback of the signals of the program, fast-forwarding can be performed when the first signal is detected, and thereafter, the fast-forwarding can be stopped when the second signal is detected. However, this apparatus has a problem in that when the recording and the playback of a plurality of standard television broadcast programs, such as serial television broadcast programs to be broadcasted in parts, are performed, the position, at which playback or cutting is started, and the position, at which the playback or the cutting is stopped, should be recorded corresponding to each of the broadcast programs.

The second related-art apparatus is enabled to skip the playback of a CM at the playback of a broadcast program by extracting channel information of the recorded broadcast program, and then detecting whether a change occurs in the channel information, and subsequently indexing, when an occurrence of a change in the channel information is detected, the recorded broadcast program with an index indicating the occurrence of the change in the channel information. However, this apparatus is adapted to skip the playback of a CM by detecting the CM according to a change in PID (Program Identification) information, and is not adapted to select video-and-audio parts, the playback of which a user wishes to skip.

The third related-art apparatus is enabled to ensure a free space of a recording medium by storing user operation history information, which represents a history of performing user operations of recording and reproducing of a program according to a user's instruction, and then determining an erasure region of the recorded program according to the user operation history information, and performing partial erasure or no-erasure (or skipping) on the program, which is recorded according to the user operation history information. However, this apparatus has a problem in that when the recording and the playback of a plurality of standard television broadcast programs, such as serial television broadcast programs to be broadcasted in parts, are performed, the playback or the no-playback (or the skipping) of video and audio signals of the standard television broadcast programs recorded on the recording medium should be instructed corresponding to each of the broadcast programs.

The invention is accomplished in view of the problems of the related-arts. It is an object of the invention to provide a recoding and reproducing apparatus enabled to reproduce only a main part of each of a plurality of standard television broadcast programs by easily skipping playback of or cutting an unnecessary part, such as a CM, of each of the standard television broadcast programs, and is also to provide a method adapted to edit video and audio signals of the television broadcast program.

According to an aspect of the invention, there is provided a recording and reproducing apparatus configured to record and reproduce video and audio signals of a television broadcast program on and from a recording medium. This recording and reproducing apparatus includes a selection unit adapted to select a plurality of standard television broadcast programs recorded on the recording medium, a standard video-and-audio part registration unit adapted to reproduce video and audio signals of one of the plurality of standard television broadcast programs selected by the selection unit, to attach markers to a standard video-and-audio part, and to register the markers, a determination unit adapted to serially reproduce video and audio signals of another one of the plurality of standard television broadcast programs selected by the selection unit, and to determine a video-and-audio part substantially matched with the registered standard video-and-audio part by comparing the reproduced video-and-audio part with the registered standard video-and-audio part, and a marker attachment unit adapted to attach markers to a video-and-audio part of another standard television broadcast program, which part is substantially matched with the standard video-and-audio part, according to a result of determination, which is made by the determination unit.

An embodiment of this recording and reproducing apparatus further includes a reproduction control unit adapted to reproduce video and audio signals of the plurality of standard television broadcast programs recorded on the recording medium by skipping, when video and audio signals of the plurality of standard television broadcast programs recorded on the recording medium, reproduction of a video-and-audio part to which the markers are attached.

In an aspect of the invention, a recording and reproducing apparatus is adapted so that a plurality of standard television broadcast programs recorded on the recording medium are selected, that video and audio signals of one of the plurality of standard television broadcast programs selected by the selection unit are reproduced, that then, markers are attached to a standard video-and-audio part and are registered, that video and audio signals of another one of the plurality of standard television broadcast programs selected by the selection unit are serially reproduced, that a video-and-audio part substantially matched with the registered standard video-and-audio part is determined by comparing the reproduced video-and-audio part with the registered standard video-and-audio part, that markers are attached to a video-and-audio part of another standard television broadcast program, which part is substantially matched with the standard video-and-audio part, according to a result of determination, and that video and audio signals of the plurality of standard television broadcast programs recorded on the recording medium are reproduced by skipping, when video and audio signals of the plurality of standard television broadcast programs recorded on the recording medium, reproduction of a video-and-audio part to which the markers are attached. Thus, markers are attached to the standard video and audio part of an unnecessary portion, such as a CM, of one of the plurality of standard television broadcast programs, such as serial television broadcast programs to be broadcasted in parts. Also, the markers are registered. Then, markers are attached to a video-and-audio part of another one of the plurality of standard television broadcast programs, which part is substantially matched with the registered standard video-and-audio part. When the plurality of standard television broadcast programs are reproduced, the video-and-audio part of the unnecessary part, to which the markers are attached, is skipped. Thus, only a main part of each of the plurality of standard television broadcast programs can be reproduced.

In another aspect of the invention, a recording and reproducing apparatus is adapted so that a plurality of standard television broadcast programs recorded on the recording medium are selected, that video and audio signals of one of the plurality of standard television broadcast programs selected by the selection unit are reproduced, that then, markers are attached to a standard video-and-audio part and are registered, that video and audio signals of another one of the plurality of standard television broadcast programs selected by the selection unit are serially reproduced, that a video-and-audio part substantially matched with the registered standard video-and-audio part is determined by comparing the reproduced video-and-audio part with the registered standard video-and-audio part, and that markers are attached to a video-and-audio part of another standard television broadcast program, which part is substantially matched with the standard video-and-audio part, according to a result of determination. Thus, markers can be attached to the standard video and audio part of an unnecessary portion, such as a CM, of one of the plurality of standard television broadcast programs, such as serial television broadcast programs to be broadcasted in parts. Also, such markers are registered. Further, markers are attached to a video-and-audio part of another one of the plurality of standard television broadcast programs, which part is substantially matched with the registered standard video-and-audio part.

An embodiment of this recording and reproducing apparatus is adapted so that video and audio signals of the plurality of standard television broadcast programs recorded on the recording medium are reproduced by skipping, when video and audio signals of the plurality of standard television broadcast programs recorded on the recording medium, reproduction of a video-and-audio part to which the markers are attached. Thus, when the plurality of standard television broadcast programs are reproduced, the video-and-audio part of the unnecessary part, to which the markers are attached, is skipped. Consequently, only a main part of each of the plurality of standard television broadcast programs can be reproduced.

In still another aspect of the invention, a method of editing video and audio signals in a recording and reproducing apparatus is adapted so that a plurality of standard television broadcast programs recorded on the recording medium are selected, that video and audio signals of one of the plurality of standard television broadcast programs selected by the selection unit are reproduced, that then, markers are attached to a standard video-and-audio part and are registered, that video and audio signals of another one of the plurality of standard television broadcast programs selected by the selection unit are serially reproduced, that a video-and-audio part substantially matched with the registered standard video-and-audio part is determined by comparing the reproduced video-and-audio part with the registered standard video-and-audio part, and that markers are attached to a video-and-audio part of another standard television broadcast program, which part is substantially matched with the standard video-and-audio part, according to a result of determination. Thus, markers can be attached to the standard video and audio part of an unnecessary portion, such as a CM, of one of the plurality of standard television broadcast programs, such as serial television broadcast programs to be broadcasted in parts. Also, such markers are registered. Further, markers are attached to a video-and-audio part of another one of the plurality of standard television broadcast programs, which part is substantially matched with the registered standard video-and-audio part.

BRIEF DESCRIPTION OF THE DRAWINGS

These and other objects and advantages of this invention will become more fully apparent from the following detailed description taken with the accompanying drawings in which.

DESCRIPTION OF EMBODIMENTS

Hereinafter, the best mode for carrying out the invention is described in detail by appropriately referring to the accompanying drawings.

Figure 1:
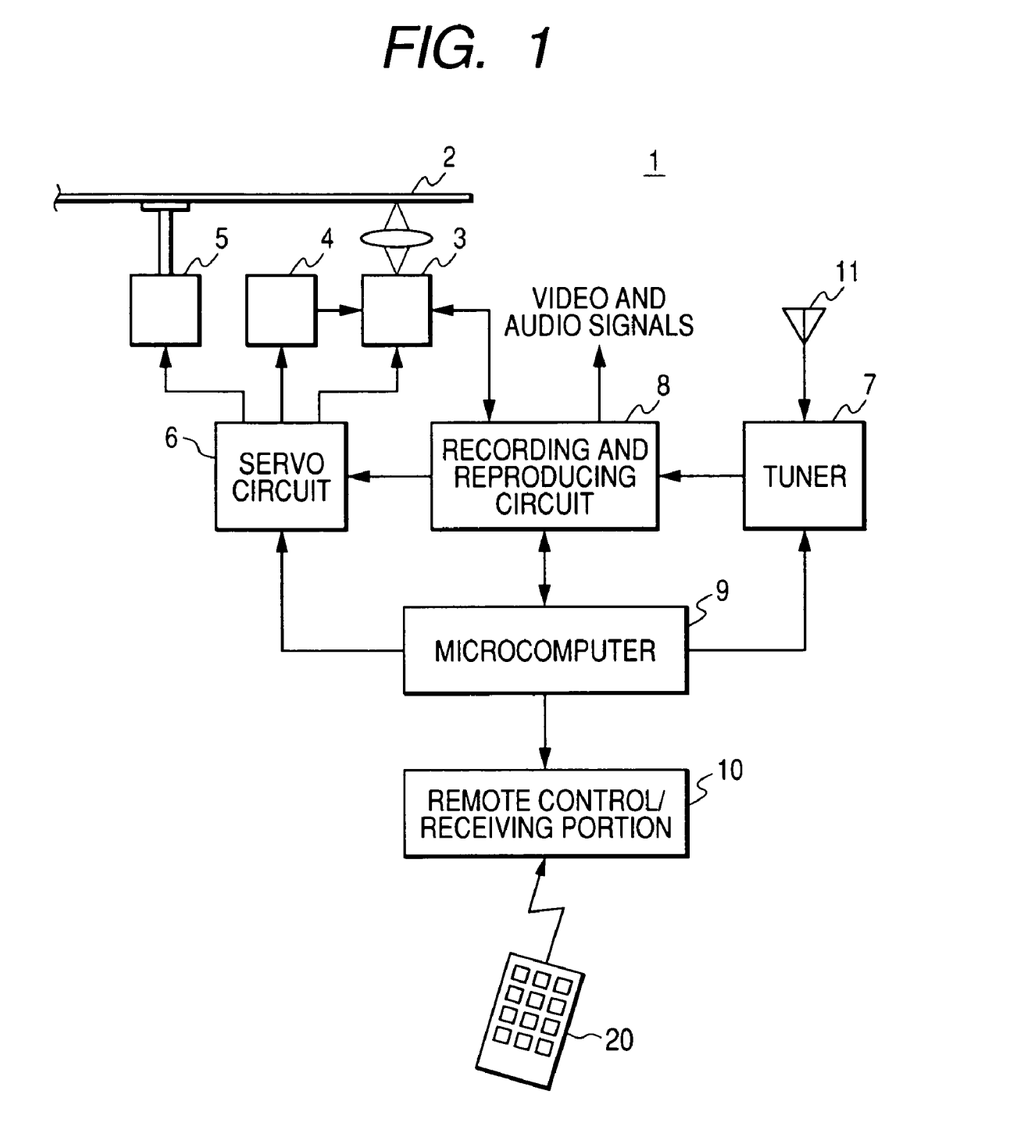
FIG. 1 is a block diagram illustrating a recording and reproducing apparatus according to an embodiment of the invention.

First, the embodiment is described below with reference to a block diagram shown in FIG. 1, which illustrates the configuration of a recording and reproducing apparatus that is the embodiment of the invention. The recording and reproducing apparatus 1 includes an optical pickup 3 that is configured to irradiate laser light onto an optical disk 2 to thereby record video and audio signals on the optical disk 2 and that is also configured to irradiate laser light onto an optical disc 2 and to detect reflection light to thereby read video and audio signals recorded on the optical disc 2, a thread motor 4 configured to move the optical pickup 3 in the direction of a radius of the optical disk 2, a spindle motor 5 configured to cause the optical disk 2 to rotate, a servo circuit 6 that is configured to servo-control the direction of rotation of the thread motor 4 and the rotational speed thereof and the rotational speed of the spindle motor 5 and that is also configured to servo-control tracking and focusing of the optical pickup 2 according to a tracking error signal and a focusing error signal detected by the optical pickup 3, a tuner 7 configured to receive a television broadcast program of a channel selected from television broadcast radio waves received by an antenna 11, a recording and reproducing circuit 8 configured to detect video and audio signals in synchronization with reference clock signals to thereby demodulate the video and audio signals read by the optical pickup 3, that is also configured to correct errors of the demodulated video and audio signals thereby to decompress video and audio signals compressed according to a predetermined compression method and thereby to demodulate and reproduce the video and audio signals, and that is also configured to encode video and audio signals of a television broadcast program received by the tuner 7, to compress the encoded video and audio signals according to a predetermined compression method, and to cause the optical pickup 3 to record the video and audio signals on the optical disk 2, a microcomputer 9 configured to control the entire recording and reproducing apparatus 1, and a remote control receiving portion 10 configured to receive a remote control signal that is an infrared signal transmitted from a remote control device 20, and to convert the received remote control signal to a predetermined electrical signal.

Hereunder, an operation of the recording and reproducing apparatus constructed as described above.

When the recording of video and audio signals of a television broadcast program broadcasted of a channel selected by a key operation of the remote control device 20 or a timer programming operation is instructed, a microcomputer 9 sends a control signal to the servo circuit 6 to thereby cause the spindle motor 5 to rotate. Thus, the optical disk 2 is rotated. Also, the thread motor 4 is rotated to thereby perform the thread movement of the optical pickup 3 in the direction of a radius of the optical disk 2. Video and audio signals of the television broadcast program received by the tuber 7 are compression-coded in a predetermined method. The video and audio signals of the television broadcast program are recorded on the optical disk 2 by the optical pickup 3.

Figure 2:
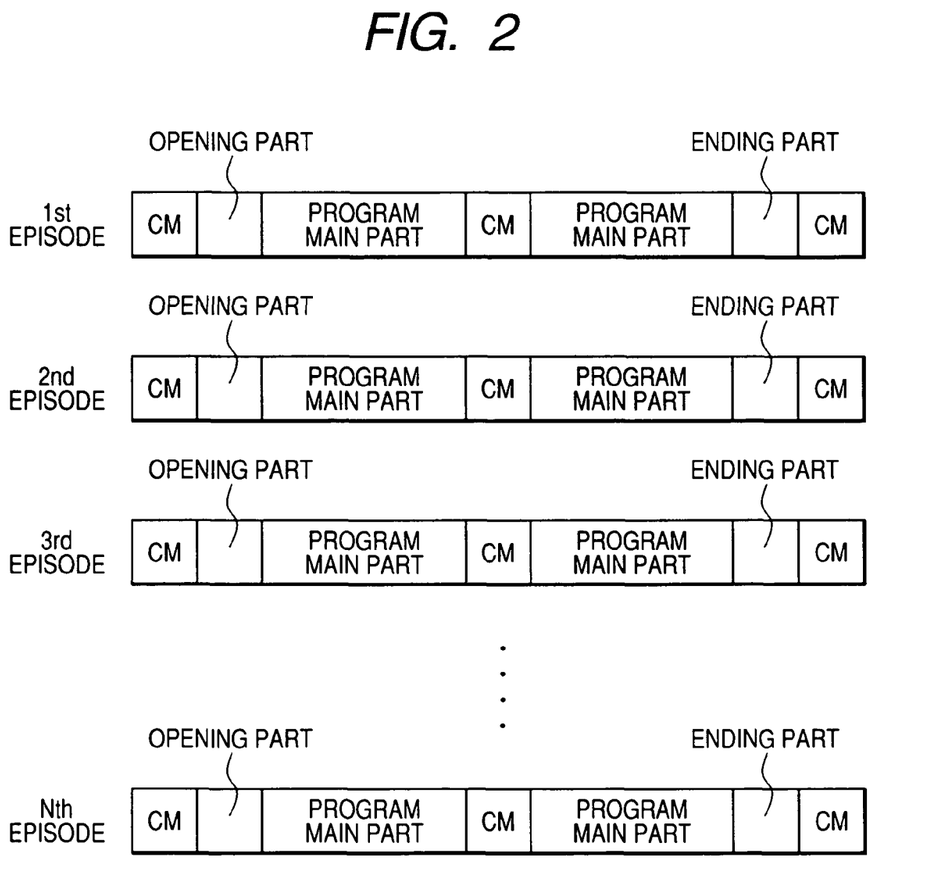
FIG. 2 is a diagram illustrating the configuration of a standard television broadcast program.

When the playback of one of a plurality of standard television broadcast programs (see FIG. 2), such as serial television broadcast programs, recorded on an optical disk, for example, a broadcast program of a first episode program is instructed by a key operation of the remote control device 20, the microcomputer 9 sends a control signal to the servo circuit 6. Thus, the spindle motor 5 is caused to rotate, so that the optical disk 2 is rotated. Also, the thread motor 4 is caused to rotate to thereby perform the thread movement of the optical pickup 3 in the direction of a radius of the optical disk 2. Then, video and audio signals of the selected one of a plurality of the standard television programs recorded on the optical disk 2 are reproduced. While the video and audio signals of the selected one of a plurality of the standard television programs recorded on the optical disk 2 are reproduced, in a case where the registration of a standard video and audio part of the video and audio signals of the reproduced broadcast program is instructed by a key operation of the remote control device 20, the microcomputer 9 attaches markers to the standard video-and-audio part of the video and audio signals of the reproduced broadcast program and also registers the standard video-and-audio part (see FIGS. 3A to 3C).

Figure 4A:
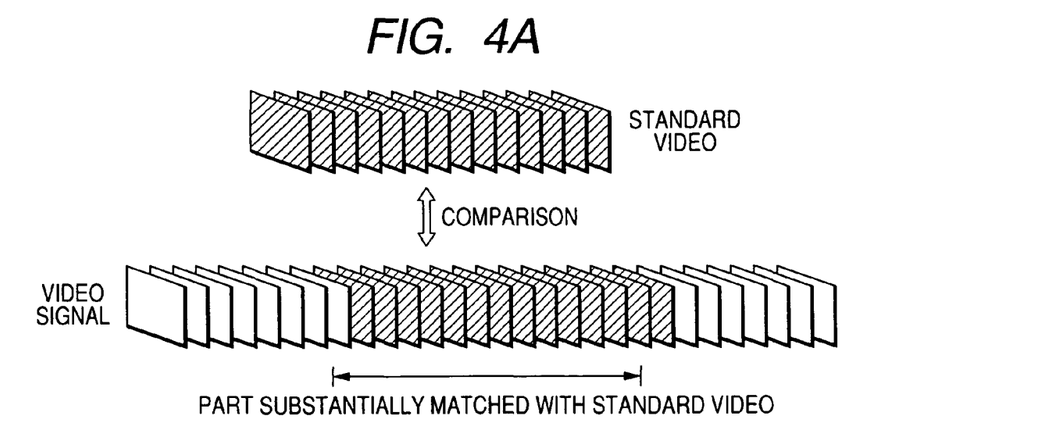
FIGS. 4A to 4C are explanatory diagrams illustrating an operation of the recording and reproducing apparatus according to the embodiment.
Figure 4B:
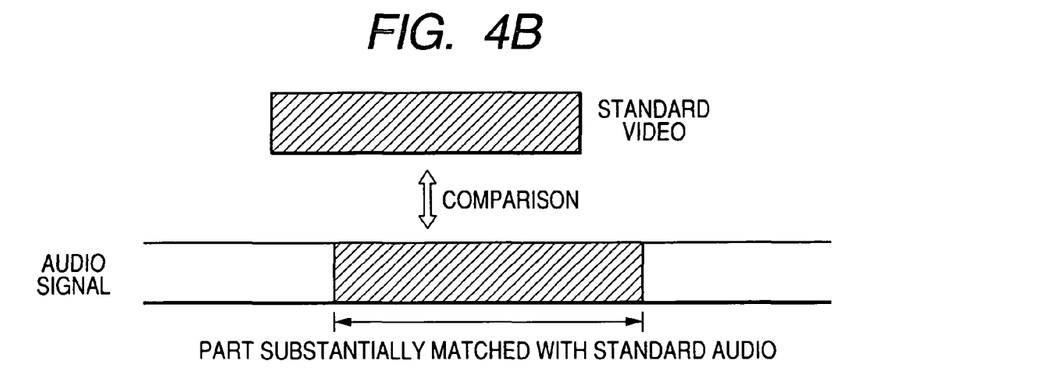
Figure 4C:
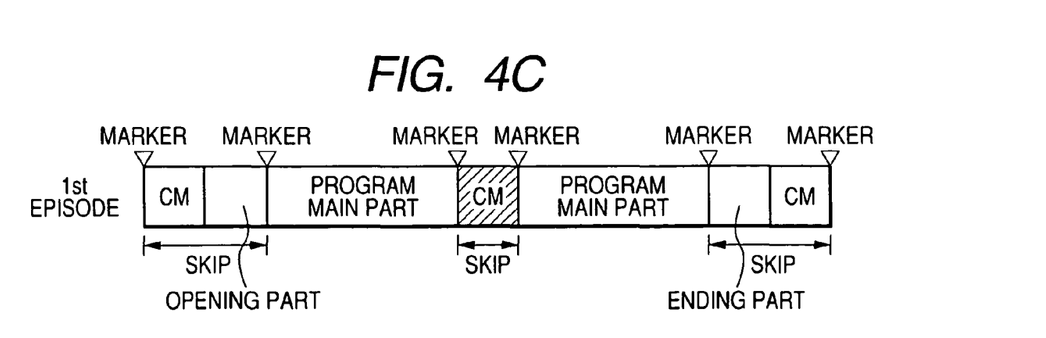

Upon completion of the registration of the standard video-and-audio part, such as a CM, of the standard television broadcast program, the microcomputer 9 serially reproduces video and audio signals of another one of the plurality of selected standard television broadcast programs. Then, the microcomputer 9 compares the reproduces video and audio signals of the latter one of the plurality of selected standard television broadcast programs with the registered standard vide and audio part. Subsequently, the microcomputer 9 attaches markers to a video-and-audio part of the latter one of standard television broadcast programs, which part is substantially matched with the registered standard video-and-audio part, and also records this video-and-audio part of the latter one of standard television broadcast programs on the optical disk 2 (see FIG. 4).

When the playback of video and audio signals of the plurality of standard television broadcast programs recorded on the optical disk 2, to which the markers are attached, is instructed by a key operation of the remote control device 20, the microcomputer 9 sends a control signal to the servo circuit 6. Thus, the spindle motor 5 is caused to rotate, so that the optical disk 2 is rotated. Also, the thread motor 4 is caused to rotate to thereby perform the thread movement of the optical pickup 3 in the direction of a radius of the optical disk 2. Then, video and audio signals of the selected one of a plurality of the standard television programs recorded on the optical disk 2 are reproduced. When the marker attached to the reproduced video and audio signals is detected, the microcomputer 9 sends a control signal to the servo circuit 6. Thus, the thread movement of the optical pickup 3 is caused to thereby skip the playback of the video and audio signals, to which the marker is attached. When the next marker attached to the video and audio signals is detected, the skipping of the video and audio signals is stopped. Also, the normal playback of the video and audio signals is performed (see FIG. 4). Consequently, markers are attached to a standard video-and-audio part of one of the standard television broadcast programs. Then, this standard video-and-audio part is registered. Also, markers are attached to a video-and-audio part of another one of the plurality of standard television broadcast programs, which part is substantially matched with the registered standard video-and-audio part. Thus, unnecessary parts, such as a CM, of each of the plurality of standard television broadcast programs are easily skipped. Consequently, the video and audio signals can be reproduced.

Figure 5:
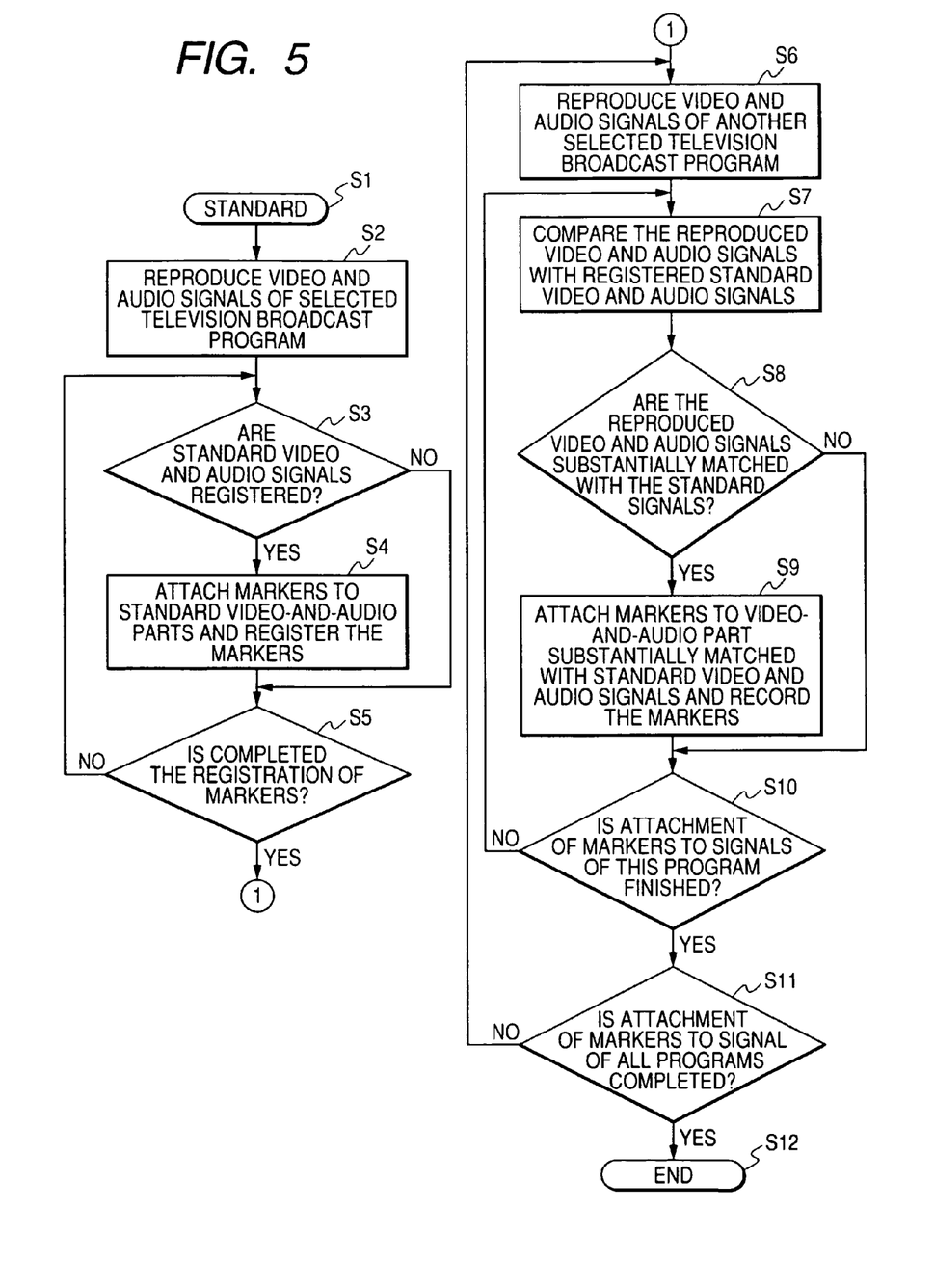
FIG. 5 is a flowchart illustrating an operation of the recording and reproducing apparatus according to the embodiment.

An operation of the recording and reproducing apparatus, which is an embodiment of the invention, is described below with reference to the flowchart illustrated in FIG. 5.

When the playback of one of the plurality of standard television broadcast programs recorded on the optical disk is instructed by a key operation of the remote control device, the operation advances from step S1 to step S2, in which video and audio signals of the selected television broadcast program are reproduced. Then, the operation advances to step S3.

In step S3, it is determined whether the registration of a standard video-and-audio part of reproduced video and audio signals is instructed by a key operation of the remote control device. If the registration of the standard video-and-audio part of the reproduced video and audio signals is instructed by the key operation of the remote control device, the operation proceeds to step S4. If the registration of the standard video-and-audio part of the reproduced video and audio signals is not instructed by the key operation of the remote control device, the operation proceeds to step S5.

In step S4, markers are attached to the standard video-and-audio part of the reproduced video audio signals and are registered in an optical disk. Then, the operation advances to step S5.

In step S5, it is determined whether the registration of the markers attached to the standard video-and-audio part is completed. If the registration of the markers of the standard video-and-audio part is completed, the operation advances to step S6. If the registration of the markers of the standard video-and-audio part is not completed, the operation returns to step S3. Then, the process consisting of step S3 to step S5 is repeated.

In step S6, video and audio signals of another one of the selected standard television broadcast programs are reproduced. Then, the operation advances to step S7.

In step S7, the reproduced video-and-audio part is compared with the registered standard video-and-audio part. Then, the operation advances to step S8.

In step S8, it is determined whether the reproduced video-and-audio part is substantially matched with the registered standard video-and-audio part. If the reproduced video-and-audio part is substantially matched with the registered standard video-and-audio part, the operation advances to step S9. If the reproduced video-and-audio part is not substantially matched with the registered standard video-and-audio part, the operation proceeds to step S10.

In step S9, markers are attached to the video-and-audio part of another standard television program, which part is substantially matched with the registered standard video-and-audio part, and are recorded on the optical disk. Then, the operation advances to step S10.

In step S10, it is determined whether the attachment of the markers to the standard video-and-audio part of the video and audio signals of the selected another of the selected television broadcast programs is finished. If the attachment of the markers to the standard video-and-audio part of the video and audio signals of the selected another of the selected television broadcast programs is finished, the operation advances to step S11. If the attachment of the markers to the standard video-and-audio part of the video and audio signals of the selected another of the selected television broadcast programs is not finished, the operation returns to step S7. Then, the process consisting of steps S7 to S10 is repeated.

In step S11, it is determined whether the attachment of markers to the standard video-and-audio parts of all the selected standard television broadcast programs is completed. If the attachment of markers to the standard video-and-audio parts of all the selected standard television broadcast programs is completed, the operation advances to step S12, in which the operation is finished. If the attachment of markers to the standard video-and-audio parts of all the selected standard television broadcast programs is not completed, the operation returns to step S6. Then, the process consisting of step S6 to S11 is repeated.

Upon completion of the registration of the standard video-and-audio part, such as a CM, of the standard television broadcast program, the microcomputer 9 serially reproduces video and audio signals of another one of the plurality of selected standard television broadcast programs. Then, the microcomputer 9 compares the reproduces video and audio signals of the latter one of the plurality of selected standard television broadcast programs with the registered standard vide and audio part. Subsequently, the microcomputer 9 attaches markers to a video-and-audio part of the latter one of standard television broadcast programs, which part is substantially matched with the registered standard video-and-audio part, and also records this video-and-audio part of the latter one of standard television broadcast programs on the optical disk 2 (see FIG. 4).

Figure 3A:
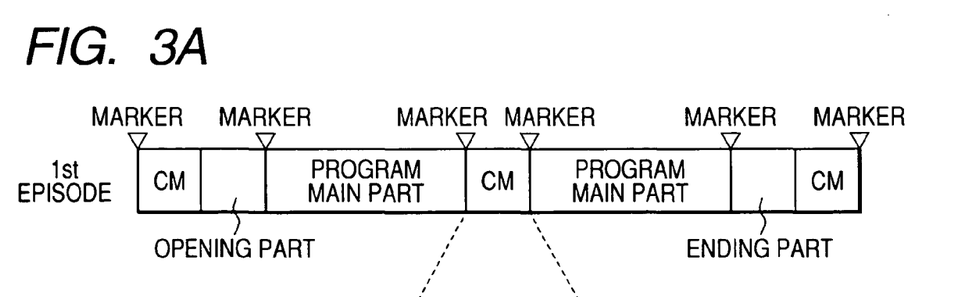
FIGS. 3A to 3C are explanatory diagrams illustrating an operation of the recording and reproducing apparatus according to the embodiment.
Figure 3B:
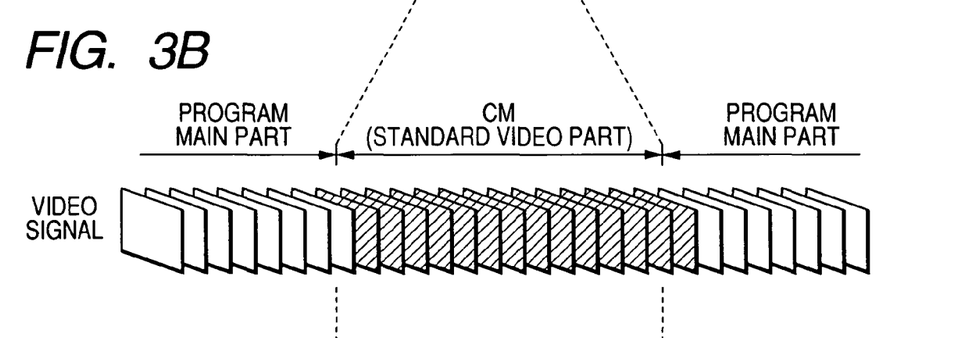
Figure 3C:
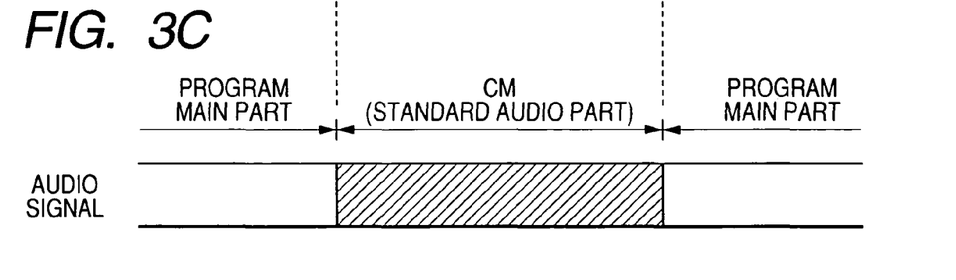
Figure 6A:
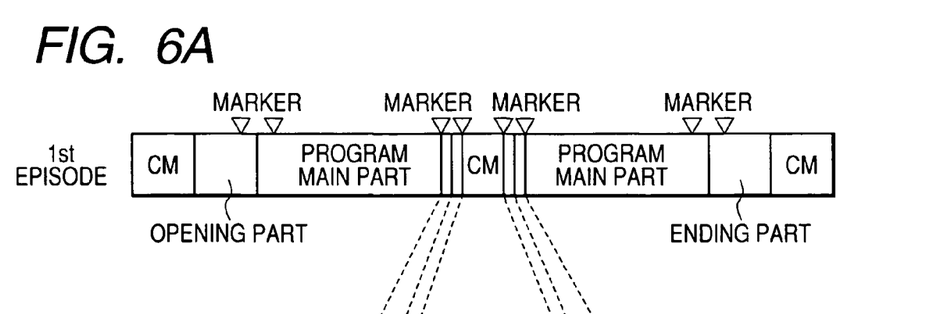
FIGS. 6A to 6C are explanatory diagrams illustrating an operation of the recording and reproducing apparatus according to another embodiment.
Figure 6B:
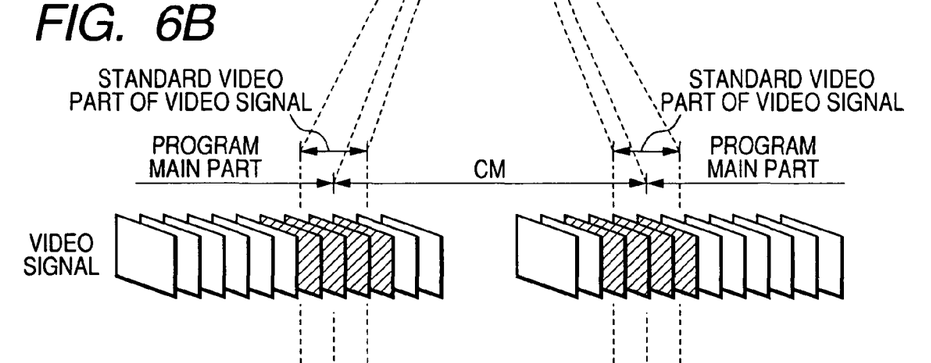
Figure 6C:
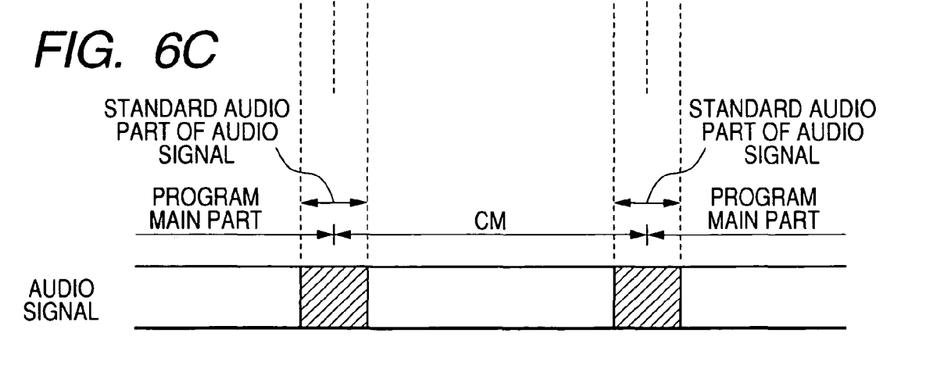

FIGS. 6A, 6B, 6C show another example of video-and-audio part which is substantially matched with the registered standard video-and-audio part as shown in FIGS. 3A to 3C. In the example of the video-and-audio part, markers, as well as FIG. 4, are attached by the microcomputer at an end part of program main part and a front part of CM part, so that the video-and-audio part including a standard video part of the video signal and a standard audio part of the audio signal may go across the program main part and the CM part.

In the foregoing description, the best mode for carrying out the invention has been described in detail. However, the invention is not limited thereto. Needless to say, modifications and improvements of the invention can be made. It has been described that for example, when the video and audio signals of the standard television broadcast program recorded on the recording medium are reproduced, the markers attached to the video-and-audio part substantially matched with the standard video-and-audio part are detected to thereby skip the playback of the video and audio signals, so that only a main part of the video and audio signals of the standard television broadcast program is reproduced. However, the dubbing of only the main part of the standard television broadcast program can easily be achieved by detecting, when the dubbing of the video and audio signals of the standard television broadcast program is performed, markers attached to the video-and-audio part substantially matched with the standard video-and-audio part to thereby cut the video and audio signals.

What is claimed is:

1. A recording and reproducing apparatus configured to record and reproduce video and audio signals of a television broadcast program on and from a recording medium, comprising:

a selection unit configured to select one of a plurality of standard television broadcast programs recorded on the recording medium, in response to a key operation of a remote control device by a user;

a registration unit configured to reproduce video and audio signals of the one of the plurality of standard television broadcast programs, which is selected by the selection unit, attach a marker to a standard video-and-audio part in the video and audio signals of the one of the plurality of standard television broadcast programs in response to a key operation of the remote control device by the user during reproducing the video and audio signals of the one of the plurality of standard television broadcast programs, and register the marker;

a determination unit configured to serially reproduce video and audio signals of another one of the plurality of standard television broadcast programs which is selected by the selection unit, automatically determine a video-and-audio part in the video and audio signals of the another one of the plurality of standard television broadcast programs, which is substantially matched with the standard video-and-audio part to which the registered marker is attached by comparing the video-and-audio part in the video and audio signals of the another one of the plurality of standard television broadcast programs with the standard video-and-audio part to which the registered marker is attached during reproducing the video and audio signals of the another one of the plurality of standard television broadcast programs;

a marker attachment unit configured to automatically attach a marker to the video-and-audio part in the video and audio signals of the another one of the standard television broadcast programs, which is substantially matched with the standard video-and-audio part to which the registered marker is attached, according to a result of determination made by the determination unit; and a reproduction control unit configured to skip the video-and-audio part to which the marker is attached during reproducing the video and audio signals of the plurality of standard television broadcast programs recorded on the recording medium.

2. A recording and reproducing apparatus configured to record and reproduce video and audio signals of a television broadcast program on and from a recording medium, comprising:

a selection unit configured to select one of a plurality of standard television broadcast programs recorded on the recording medium, in response to a user operation;

a registration unit configured to reproduce video and audio signals of the one of the plurality of standard television broadcast programs, which is selected by the selection unit, attach a marker to a standard video-and-audio part in the video and audio signals of the one of the plurality of standard television broadcast programs in response to a user operation during reproducing the video and audio signals of the one of the plurality of standard television broadcast programs, and register the marker;

a determination unit configured to serially reproduce video and audio signals of another one of the plurality of standard television broadcast programs, which is selected by the selection unit, automatically determine a video-and-audio part in the video and audio signals of the another one of the plurality of standard television broadcast programs, which is substantially matched with the standard video-and-audio part to which the registered marker is attached by comparing the video-and-audio part in the video and audio signals of the another one of the plurality of standard television broadcast programs with the standard video-and-audio part to which the registered marker is attached during reproducing the video and audio signals of the another one of the plurality of standard television broadcast programs; and a marker attachment unit configured to automatically attach a marker to the video-and-audio part in the video and audio signals of the another one of the standard television broadcast programs, which is substantially matched with the standard video-and-audio part to which the registered marker is attached, according to a result of determination made by the determination unit.

3. The recording and reproducing apparatus according to claim 2, further comprising:

a reproduction control unit configured to skip the video-and-audio part to which the marker is attached during reproducing the video and audio signals of the plurality of standard television broadcast programs recorded on the recording medium.

4. A method of editing video and audio signals of a television broadcast program in a recording and reproducing apparatus configured to record and reproduce the video and audio signals of a television broadcast program on and from a recording medium, comprising:

selecting one of a plurality of standard television broadcast programs recorded on the recording medium;

reproducing video and audio signals of the selected one of the plurality of standard television broadcast programs;

attaching a marker to a standard video-and-audio part in the video and audio signals of the selected one of the plurality of standard television broadcast programs in response to a user operation during the reproducing of the video and audio signals of the selected one of the plurality of standard television broadcast programs;

registering the marker;

selecting another one of the plurality of standard television broadcast programs;

serially reproducing video and audio signals of selected another one of the plurality of standard television broadcast programs;

automatically determining a video-and-audio part in the video and audio signals of the selected another one of the plurality of standard television broadcast programs, which is substantially matched with the registered video-and-audio part to which the registered marker is attached by comparing the video-and-audio part in the video and audio signals of the selected another one of the plurality of standard televise broadcast programs with the standard video-and-audio part to which the registered marker is attached during the reproducing of the video and audio signals of the selected another one of the plurality of standard television broadcast programs; and automatically attaching a marker to the video-and-audio part in the video and audio signals of the selected another one of the standard television broadcast programs, which is substantially matched with the standard video-and-audio part to which the registered marker is attached, according to a result of the determining.

* * * * *